United States Patent [19]
Colglazier

[11] Patent Number: 5,999,721
[45] Date of Patent: Dec. 7, 1999

[54] METHOD AND SYSTEM FOR THE DETERMINATION OF PERFORMANCE CHARACTERISTICS OF A CACHE DESIGN BY SIMULATING CACHE OPERATIONS UTILIZING A CACHE OUTPUT TRACE

[75] Inventor: Daniel James Colglazier, Cary, N.C.

[73] Assignee: International Business Machines Corporation, Armonk, N.Y.

[21] Appl. No.: 08/874,362

[22] Filed: Jun. 13, 1997

[51] Int. Cl.$^6$ .............................. G06F 11/34; G06F 12/00; G06F 17/00; G06F 19/00
[52] U.S. Cl. ................................ 395/500.41; 395/500.35; 395/500.38; 395/500.42; 395/183.21; 711/118
[58] Field of Search ..................................... 364/488–491, 364/578; 395/500, 183.13, 183.21, 500.34–500.49; 711/118

[56] References Cited

U.S. PATENT DOCUMENTS

| | | | |
|---|---|---|---|
| 5,274,811 | 12/1993 | Borg et al. | 395/700 |
| 5,452,440 | 9/1995 | Salsburg | 395/463 |
| 5,615,357 | 3/1997 | Ball | 395/500 |
| 5,619,676 | 4/1997 | Fukuda et al. | 395/464 |
| 5,862,371 | 1/1999 | Levine et al. | 395/569 |

FOREIGN PATENT DOCUMENTS

| | | | |
|---|---|---|---|
| 408263372A | 10/1996 | Japan | G06F 12/08 |

OTHER PUBLICATIONS

PTO 99–2232 (Translation of Japanese Patent Application No. 07069121, Publication No. 408263372A, Published Oct. 11, 1996, invented by Yamada et al., translated by FLS, Inc., Mar. 1999, pp. 1–18, especially pp. 2–3).

PTO 99–2233 (Translation of Korean Article: "A new trace–driven simulation algorithm for sector cache memories", Journal of the Korean Institute of Telematics and Electronics, vol. 28B, No. 3, Mar. 1, 1991, pp. 17–27, written by Park et al., translated, Apr. 1999.

Dwarkadas et al. ("Efficient Simulation of Cache Memories", Simulation Conference Proceedings, Dec. 4, 1989, pp. 1032–1041).

Agarwal et al. ("An Analytical Cache Model", ACM Transactions on Computer Systems, vol. 7, No. 2, May 1989, pp. 184–215).

Nicol et al. ("Massively Parallel Algorithm for Trace–Driven Cache Simulations", IEEE Transactions on Parallel and Distributed Systems, vol. 5, No. 8, Aug. 1994, pp. 849–859).

Sites et al. ("Multiprocessor Cache Analysis Using ATUM", IEEE, Jan. 1988, pp. 186–195).

Laha et al. ("Accurate Low–Cost Methods for Performance Evaluation of Cache Memory Systems", IEEE Transactions on Computers, vol. 37, No. 11, Nov. 1988).

Park et al. ("A new trace–driven simulation algorithm for sector cache memories", Journal of the Korean Institute of Telematics and Electronics, vol. 28B, No. 3, Mar. 1, 1991, pp. 17–27).

*Primary Examiner*—Kevin J. Teska
*Assistant Examiner*—Phallaka Kik
*Attorney, Agent, or Firm*—Lisa B. Yociss; Andrew J. Dillon

[57] ABSTRACT

A method and system are disclosed for the determination of performance characteristics of a cache design by simulating cache operations utilizing a cache output trace. A first plurality of references are input into a cache during a specified period. In response to the inputs, the cache generates an output which includes a second plurality of references. The output is stored as a trace. The trace may be modified by specifying at least one of the second plurality of references as a particular type of reference. A quantity of the first plurality of references input into the cache during the specified period is determined. Cache operation is simulated utilizing the trace by inputting the trace into a cache simulator. A result of the simulation is determined. Performance characteristics of the cache design are determined utilizing the result of the simulation and the quantity of the first plurality of references.

25 Claims, 4 Drawing Sheets

METHOD AND SYSTEM FOR THE DETERMINATION OF PERFORMANCE CHARACTERISTICS OF A CACHE DESIGN BY SIMULATING CACHE OPERATIONS UTILIZING A CACHE OUTPUT TRACE

BACKGROUND OF THE INVENTION

1. Technical Field

The present invention relates to data-processing systems, and in particular to the determination of performance characteristics of a cache design. Still more particularly, the present invention relates to a method and system for the determination of performance characteristics of a cache design by simulating cache operations utilizing an output trace of a cache.

2. Description of the Related Art

Data-processing systems include at least one processor which is coupled to a main memory device utilizing a bus. Information and data is transmitted between processors and the memory device utilizing the bus. In most systems, a cache is included in order to increase the rate the information and data is processed by the processors.

A cache is a special-purpose storage buffer associated with a processor which is typically smaller and faster than the main memory, and is used to hold a copy of information, such as instructions and data. Information is included in the main memory with a copy of the information being included within a cache. Optimally, the instructions and data included within the cache are the instructions and data most likely to be next requested by the processor. In multi-processor systems, each processor typically has its own cache.

When a processor needs information, it first will look for that information in the processor's cache. The information will include a reference to main memory. The reference is utilized to determine what data is needed from the main memory. The reference will include at least the address of the data to be retrieved and the request type. The reference is first utilized to determine if the information is located in the cache. If the information is not located in the cache, the processor then must retrieve the information from main memory. Because a cache is faster than main memory, information can be retrieved from a cache much faster than it can be retrieved from main memory.

Cache simulation is used to predict how well a cache design will perform. Current cache simulation is a two-step process. The first step is to capture a trace of activity from a processor to its cache. In order to capture a trace of all inputs to a cache, there must be access to the cache input. The trace will include a copy of all activity for a period of time. All references input into a cache during the period of time are captured and stored in the trace. Once a trace is completed, the trace is used as an input to a cache simulator. The cache simulator simulates the response of a particular cache design.

The cache simulator counts particular events which occur during the simulation. These counts are then combined with other statistics to produce information which indicates the performance of the cache design. For example, the number of cache misses per reference, the number of writebacks per reference, the number of snoop hits, and snoop hits to a modified cache line are important statistics to monitor.

In some systems, there are several cache buffers. A smaller cache may be first accessed by the processor. If the information is not located in the smaller cache, a second cache is accessed. Finally, if the information is not located in a second cache, main memory is accessed to retrieve the information. For systems having several levels of cache systems, it may not be possible to obtain a trace of the inputs to a cache. There may be no access to the inputs of one or more of the cache systems.

Another problem arises in current systems because a cache may be imbedded within the same integrated circuit which includes the processor. In these systems, there is no external access to the inputs of the cache.

Capturing a representative trace may also become a problem. Many millions of references are needed to simulate large cache sizes. Traces are limited in capacity by the capabilities of how they are captured and stored. Because the tools utilized to capture and store traces have a maximum capacity, there is a maximum number of references that can be captured and stored in a single trace. The longer the period of time a trace captures information, the more representative it is of the data-processing system being traced and the better it is for simulation. To simulate larger caches, longer traces are needed. Representative traces may require more references than can be captured or stored.

Therefore a need exists for a method and system for determining performance characteristics of a cache design utilizing the output of a cache in a data-processing system.

SUMMARY OF THE INVENTION

It is therefore one object of the present invention to provide an improved data-processing system.

It is another object of the present invention to provide a method and system for the determination of performance characteristics of a cache design.

It is yet another object of the present invention to provide a method and system for the determination of performance characteristics of a cache design by simulating cache operations utilizing an output trace of a cache.

The foregoing objects are achieved as is now described. A method and system are disclosed for the determination of performance characteristics of a cache design by simulating cache operations utilizing a cache output trace. A first plurality of references are input into a cache during a specified period. In response to the inputs, the cache generates an output which includes a second plurality of references. The output is stored as a trace. A quantity of the first plurality of references input into the cache during the specified period is determined. Cache operation is simulated utilizing the trace by inputting the trace into a cache simulator. A result of the simulation is determined. Performance characteristics of the cache design are determined utilizing the result of the simulation and the quantity of the first plurality of references.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives and advantages thereof, will best be understood by reference to the following detailed description of the preferred embodiment when read in conjunction with the accompanying drawings, wherein:

DETAILED DESCRIPTION OF PREFERRED EMBODIMENT

An exemplary embodiment of the present invention and its advantages are better understood by referring to FIGS. 1A–4 of the drawings, like numerals being used for like and corresponding parts of the accompanying drawings.

Figure 1A:
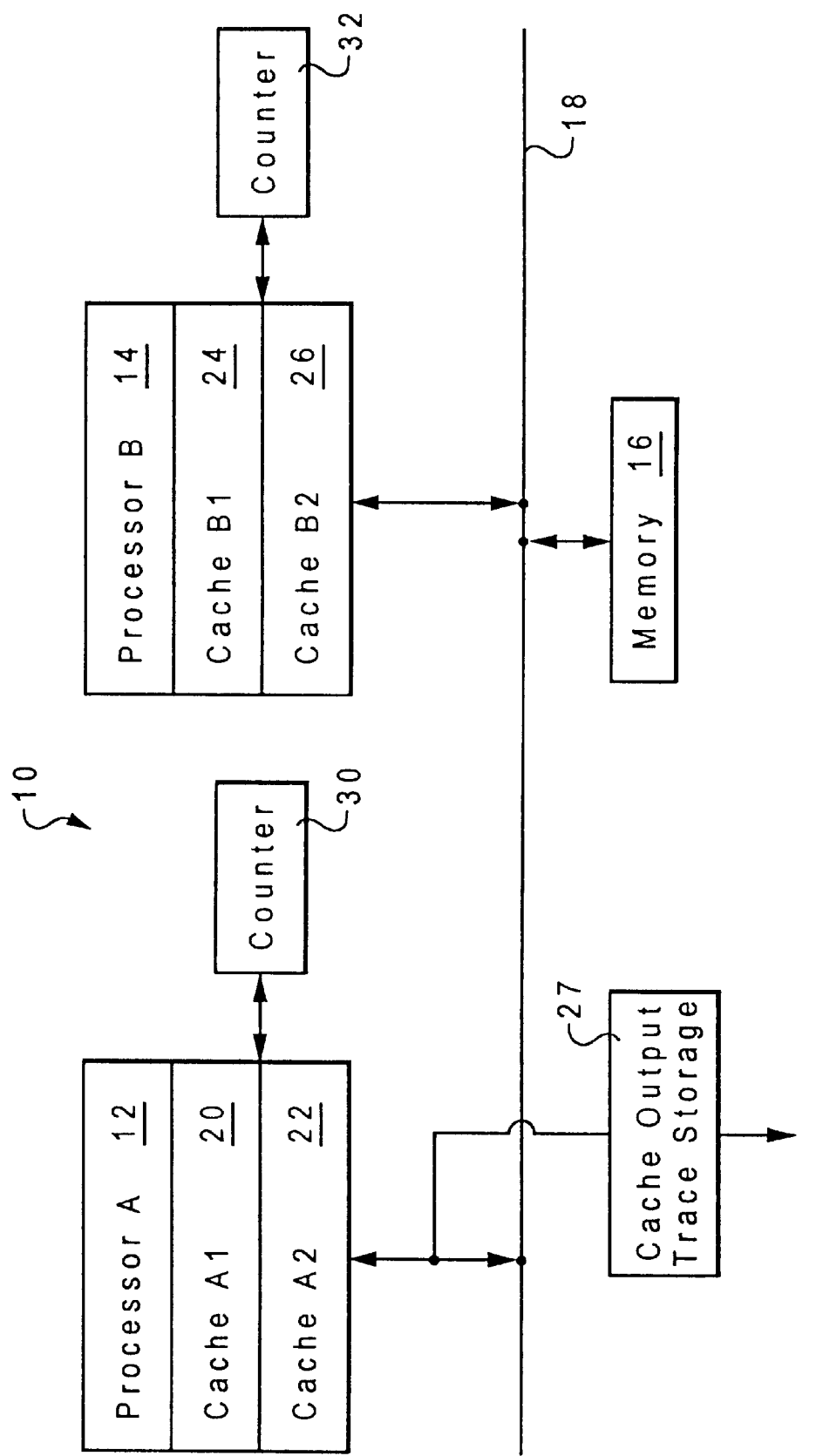
FIG. 1A depicts a high-level block diagram of a data-processing system 10 which may be utilized to implement the method and system of the present invention.
Figure 1B:
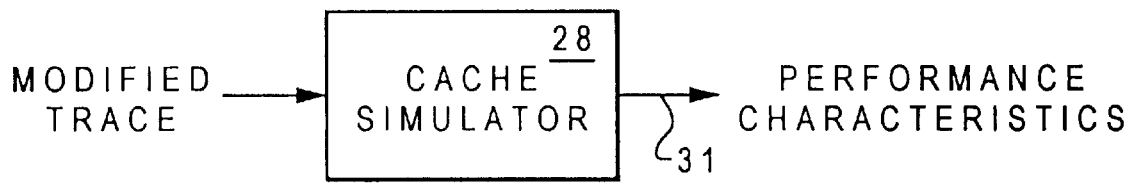
FIG. 1B illustrates a cache simulator which may be utilized to implement the method and system of the present invention.

FIG. 1A is a block diagram of a data-processing system 10 for processing information according to the preferred embodiment. Data-processing system 10 may include one or more processing systems. In the preferred embodiment, data-processing system 10 includes multiple processing systems 12 and 14. Each processing system includes at least one cache memory device and is coupled to a main memory 16 utilizing a bus 18. Bus 18 is utilized to transmit information including data and addresses from a processing system to main memory 16 and/or to another processing system.

Processing system 12 includes a cache 20 and a cache 22. Processing system 14 includes a cache 24 and a cache 26. Caches 20 and 24 may be a first level cache and may be smaller and/or faster than a second level cache such as caches 22 and 26. When a processing system needs to read or write information, the processing system will first look to its first-level cache to determine if the information is located in a cache entry in that cache. If the information is not located in that cache and the processing system includes another cache, the processing system will look next to the second-level cache to determine if the information is located there. If the information is not located in the second-level cache or if the processing system did not include a second-level cache, the processing system will attempt to read or write the information to main memory.

When the processing system attempts to read or write information to either a cache or main memory, the processing system will reference a memory address to be accessed to either read or write to. The reference will include the memory address to be accessed, the type of request, and an identification of the processing system that issued the reference. The type of request may be, for example, a request to write to a memory address, read from a memory address, or writeback to a memory address.

In data-processing systems which include multiple processors, each having its own cache, data must be consistent for all processors. In these systems, each processor may be processing different instructions. However, these different instructions may access the same memory location. A copy of the data stored at the memory location is copied into the cache associated with each of the processors. In this case, several copies of the data stored in the memory location will exist. One of these instructions may then attempt to write a different value to the cache entry associated with this memory location stored in its cache. When this occurs, the processor will write a different value into the processor's cache and associate it with the address. Now, a different value of the data is included within one cache with the original value included within main memory and the other processors' caches.

A writeback method to maintaining cache consistency permits modified data to be kept in a cache. Therefore, different values of data may be kept in a cache as described above. However, when a different processor wants to access the memory location associated with the modified data, the processor whose cache includes the modified data must supply the modified data. In this manner, modified data may be maintained without updating main memory until another processor needs the current value of the data.

One cache-consistency protocol, the MESI protocol, defines four states which are associated with a cache entry. Each cache will keep track of the states associated with each of its entries. Each entry is associated with either a modified, exclusive, shared, or invalid state. A determination of which state is associated with a particular entry in a cache is dependent on the activity of the processor associated with that cache as well as the activity on bus 18 generated by other processors.

An entry is associated with a modified state when it is the only copy of the data associated with the address of the entry in any similar level cache in the system, and the copy included within the cache is different from the data stored at that address in memory. When an entry which is associated with a modified state is again modified by the processor, the state of the entry remains "modified." At that time no bus activity is generated by this subsequent modification of the entry.

An entry is associated with an exclusive state when it is the only copy of the data associated with the address of the entry in any similar level cache in the system, and the copy included within the cache is the same as the data stored at that address in memory. A write to an entry which is associated with an "exclusive" state will cause the entry to become associated with a modified state. A change from an "exclusive" state to a "modified" state will not cause any bus activity. Therefore, no change will be seen at the output of the cache when an entry within that cache is changed from exclusive to modified.

An entry is associated with a shared state when it may not be the only copy of the data associated with the address of the entry in any similar level cache in the system. A copy of the data associated with this memory address may exist in more than one similar level cache associated with different processors in the system. A write to an entry associated with a shared state will generate bus activity which can be traced at the output of the cache.

In a multiprocessor system, the processors monitor bus activity. This monitoring is often called "snooping." Each processor monitors the information being transmitted across the bus to determine whether the processor should take an action. For example, if a first processor writes to an entry which is shared, bus activity will be generated which other processors can snoop. A second processor can then see that it holds a copy of the data associated with the memory address which was shared and written to. The second processor may then invalidate its copy of the data.

An entry is associated with an invalid state when the data associated with this entry is not valid. A write to an invalid entry will generate bus activity that can be traced at the output of the cache.

In order to test the performance of a cache design, the operation of the cache may be simulated by a cache simulator. In the method and system of the present invention, the output of a cache is captured and stored as a trace in cache output trace storage 27. A modified trace is then utilized as an input into a modified cache simulator 28, shown in FIG.

1B, to simulate operation of a cache design. The cache simulator generates a result 31 which includes parameters associated with the operation of the cache design.

Performance characteristics of a cache design may be determined utilizing the result of the simulation. Performance characteristics may include a miss rate such as a quantity of cache misses per reference, a quantity of writebacks per reference, or a quantity of snoops to a modified entry.

In the present method and system, only the output references are captured and traced. Tracing only the outputs of a cache instead of its inputs eliminates the need to access the cache inputs. The cache outputs are always available because they must be sent to main memory or the next level of cache. Tracing the cache outputs also eases the problem of capturing representative traces. Most input references to a cache are found within the cache and are not output. Therefore, a cache will have many more input references than output references. Capturing the cache input references fills a fixed size trace much faster than capturing the cache output references during the same period. A trace may be captured during a specified period. The period may be either a specified period of time, or a period which includes a specified quantity of captured references. Therefore, a trace of cache output references is more representative of cache operation than a similar size trace of cache input references as it captures cache operations during a longer period of time.

A trace of input references provides everything a cache simulator needs in order to produce a simulator result which can be used to determine performance characteristics of a cache design. However, a trace of outputs does not include everything needed for cache simulation. The quantity of input references cannot be determined by looking only at the references in a trace of a cache's output.

Data-processing system 10 includes a counter associated with each processing system. Processing system 12 includes a counter 30. Processing system 14 includes a counter 32. The counter can be used to count the quantity of input references made to a cache. Therefore, counter 30 counts the quantity of input references made during a particular period to cache 22. Counter 32 counts the quantity of input references made during the period to cache 26. The quantity of input references will be used to determine performance characteristics such as a miss rate, and the number of writebacks per reference.

The quantity of writebacks per reference is an important statistic to determine. Whether or not a cache entry has been modified is important to simulate since it determines whether or not a writeback is needed.

When an entry which had been exclusive is modified, the state associated with the entry is changed from exclusive to modified. However, no bus activity is generated. Therefore, there is no cache output to be traced. The present invention provides a method and system to determine if an exclusive entry becomes modified using only the trace captured at the output of the cache.

One can determine if an exclusive entry has been modified by looking at a trace captured at the output of the cache. When a writeback reference or a reference causing a writeback is located in the trace, the reference to the same memory address just prior to the writeback reference is designated by marking the reference. The reference along with the marking designation is stored with the trace.

Cache operation is then simulated using the modified trace. The cache simulator reads each reference and determines whether it has an associated designation. When a simulation is performed, the simulator will determine the references which are designated and keep track of the cache entries that have been referenced by designated references. When a reference is made to a cache entry which is to be replaced or is needed by another cache, it is the only copy of the data stored in the associated memory location, and it has been designated, then the simulator will treat the entry as if it had been modified. In this manner, the cache simulator can fairly accurately determine the quantity of modified states in order to accurately determine the performance characteristics of the operation of the cache.

Figure 2:
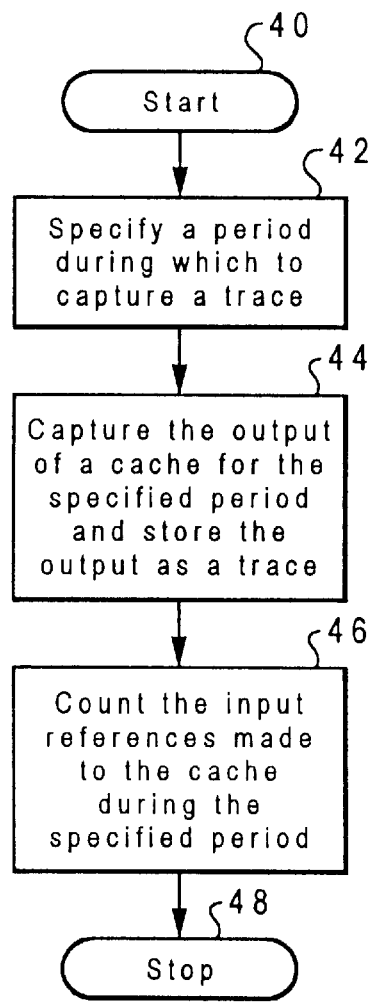
FIG. 2 is a high-level flow chart illustrating the capturing of an output of a cache and the storage of the output as a trace in accordance with the method and system of the present invention.

FIG. 2 is a high-level flow chart illustrating the capturing of the output of a cache and the storage of the output as a trace in accordance with the method and system of the present invention. The process starts as depicted at block 40 and then passes to block 42 which illustrates a specification of a period during which to capture a trace. The specified period may include either a specified period of time, or a quantity of cache output references to capture. Block 44 depicts the capturing of the output of a cache for the specified period and the storage of the output as a trace. Block 46 illustrates the counting of the input references made to a cache during the specified period. The process then terminates as depicted at block 48.

Figure 3:
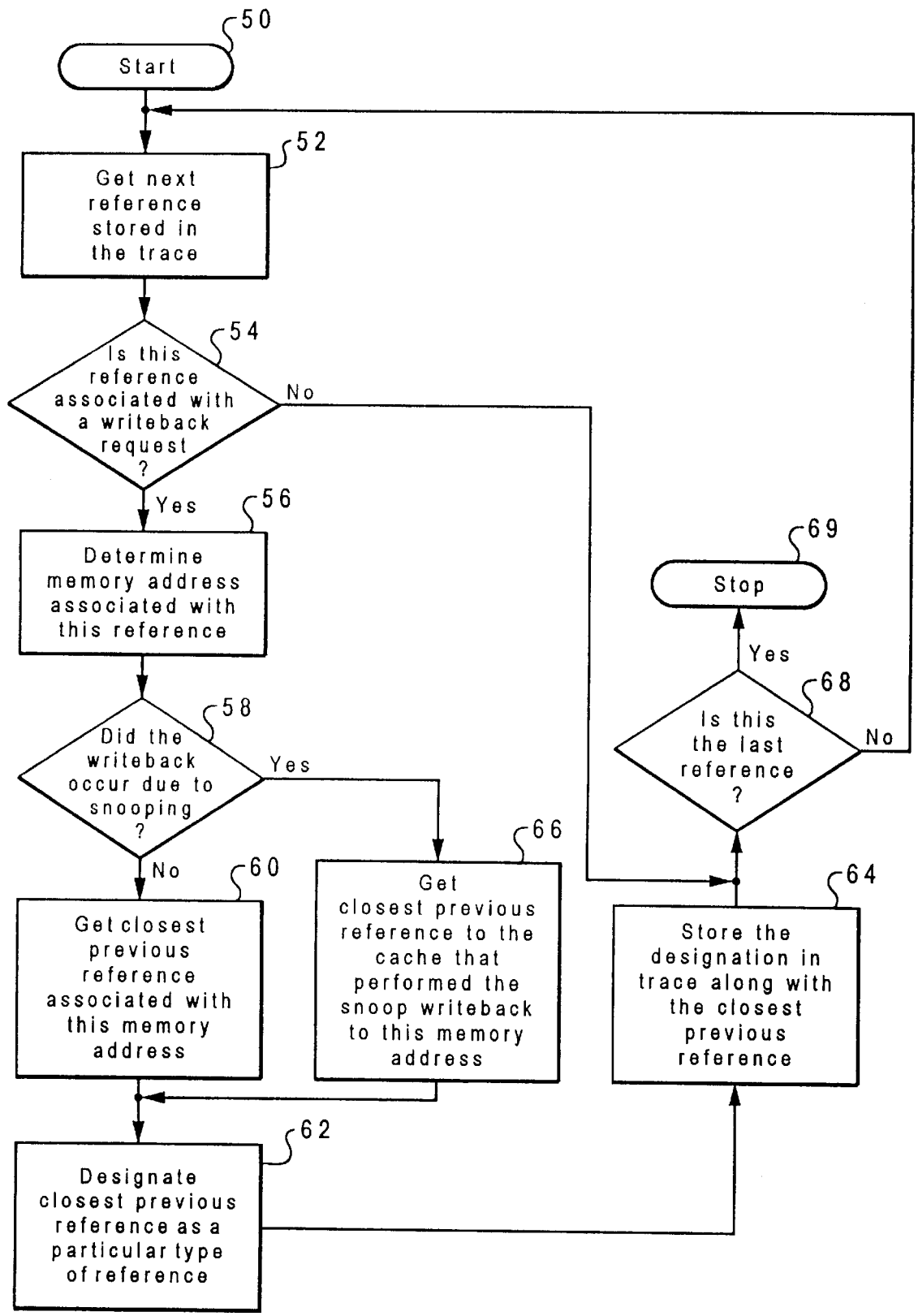
FIG. 3 is a high-level flow chart depicting a modification of a trace in accordance with the method and system of the present invention.

FIG. 3 is a high-level flow chart depicting a modification of a trace in accordance with the method and system of the present invention. The process starts as depicted at block 50 and thereafter passes to block 52 which illustrates getting the next reference stored in the trace. Block 54 depicts a determination of whether or not this reference is associated with a writeback request. If a determination is made that this reference is not associated with a writeback request, the process passes to block 68. If a determination is made that this reference is associated with a writeback request, the process passes to block 56 which depicts a determination of the memory address associated with this reference. Next, block 58 illustrates a determination of whether or not this writeback occurred due to snooping. If a determination is made that the writeback did not occur due to snooping, the process passes to block 60 which depicts getting the closest previous reference in this trace associated with this memory address.

Block 62 next illustrates the designation of a closest previous reference as a particular type of reference. Thereafter, block 64 depicts the storage of the designation in the trace along with the closest previous reference. The process then passes to block 68 which illustrates a determination of whether or not this is the last reference. If a determination is made that this is not the last reference, the process passes back to block 52. If a determination is made that this is the last reference, the process terminates as depicted by block 69.

Referring again to block 58, if a determination is made that the writeback did occur due to snooping, the process passes to block 66 which depicts getting the closest previous reference in the trace to the cache that performed the snoop writeback to this memory address. The process then passes to block 62.

Figure 4:
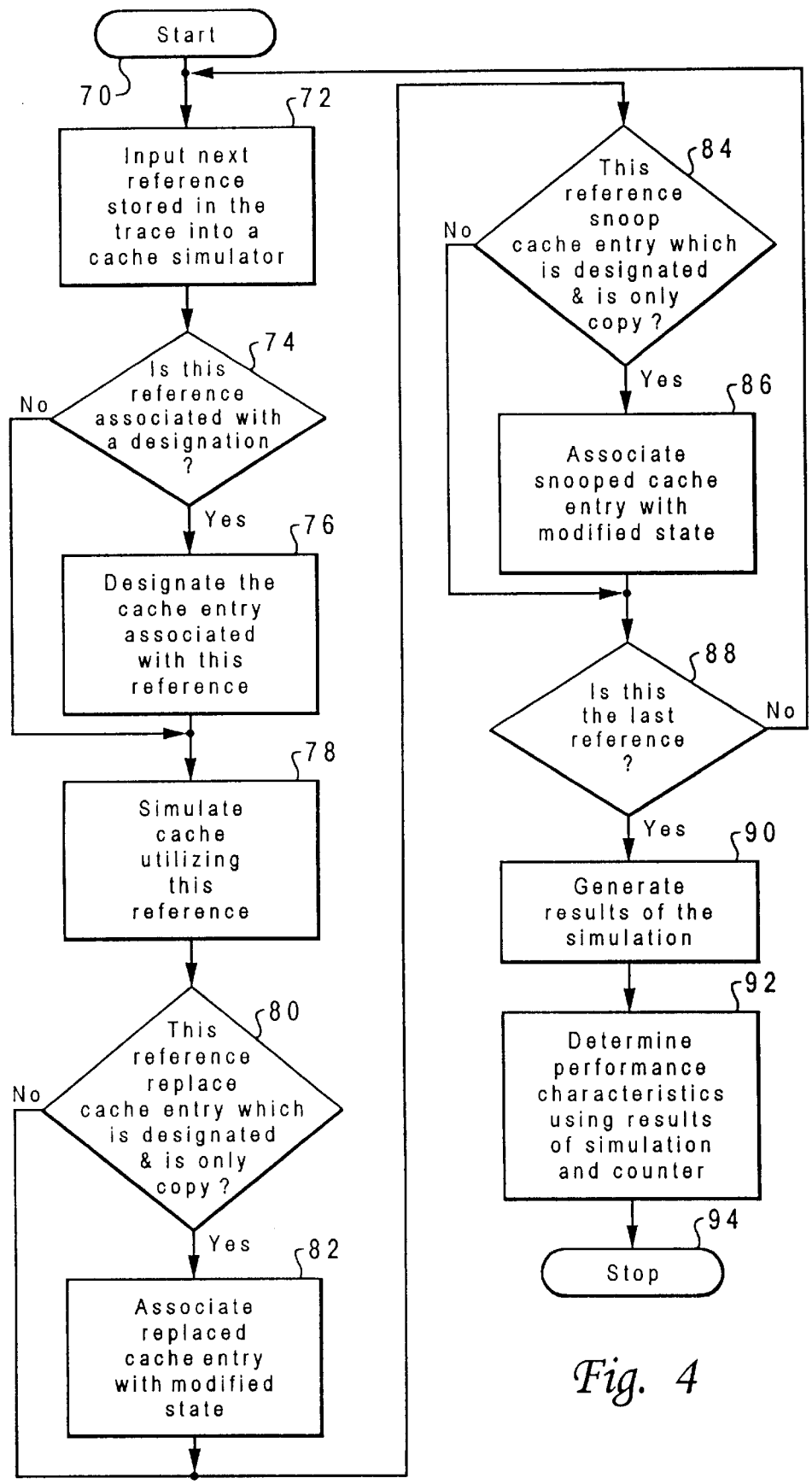
FIG. 4 is a high-level flow chart illustrating a simulation of a cache design in accordance with the method and system of the present invention.

FIG. 4 is a high-level flow chart illustrating a simulation of a cache in accordance with the method and system of the present invention. The process starts as depicted at block 70 and thereafter passes to block 72 which illustrates the inputting of the next reference stored in the trace into a cache simulator. Thereafter, block 74 depicts a determination of whether or not this reference is associated with a designation. If a determination is made that the reference is associated with a designation, the process passes to block 76 which depicts a designation of the cache entry associated with the reference. Each reference is associated with a memory location, with a particular cache, and with a particular entry in the cache. This particular cache entry is associated with a designated state. Thereafter, the process passes to block 78. Referring again to block 74, if a determination is made that this reference is not associated with a designation, the process passes to block 78. Block 78 illustrates the simulation of the cache utilizing this reference.

Thereafter, block 80 depicts a determination of whether or not this reference replaces a cache entry which is the only copy and has been designated. If a determination is made that this reference replaces a cache entry which is the only copy and has been designated, the process passes to block 82 which illustrates the association of the replaced cache entry with a modified state. The process then passes to block 84. Referring again to block 80, if a determination is made that this reference does not replace a cache entry which is the only copy and has been designated, the process passes to block 84.

Block 84 illustrates a determination of whether or not this reference snoops a cache entry which is the only copy and has been designated. If a determination is made that this reference snoops a cache entry which is the only copy and has been designated, the process passes to block 86 which illustrates the association of the snooped entry with a modified state. The process then passes to block 88. Referring again to block 84, if a determination is made that this reference does not snoop a cache entry which is the only copy and has been designated, the process passes to block 88.

Block 88 depicts a determination of whether or not this is the last reference in the trace. If a determination is made that this is not the last reference in the trace, the process passes back to block 72. Referring again to block 88, if a determination is made that this is the last reference included within the trace, the process passes to block 90 which depicts the generation of a result of the simulation. Block 92, next, illustrates a determination of performance characteristics using the result of the simulation and the quantity of input references determined by the counter. The process then terminates as depicted at block 94.

While a preferred embodiment has been particularly shown and described, it will be understood by those skilled in the art that various changes in form and detail may be made therein without departing from the spirit and scope of the present invention.

I claim:

1. A method in a shared memory multiprocessor system for determining performance characteristics of a cache design, wherein each of said multiprocessors includes a private cache, and wherein said multiprocessors are capable of sharing data, said method comprising the steps of:

inputting a first plurality of references into one of said private caches during a specified period and generating an output which includes a second plurality of references utilizing said one of said private caches in response to said inputting, wherein said output includes only cache misses and cache writebacks;

storing said output of said one of said private caches generated during said specified period as a trace;

determining a quantity of said first plurality of references input into said one of said private caches during said specified period;

simulating operation of said cache design utilizing said trace by inputting said trace into a cache simulator;

determining a result of said simulation; and determining performance characteristics of said cache design utilizing said result of said simulation and said quantity of said first plurality of references.

2. The method according to claim 1 further including the steps of:

modifying said trace by specifying at least one of said second plurality of references as a particular type of reference, wherein said modified trace is utilized during said step of simulating operation of said one of said private caches.

3. The method according to claim 2, wherein said specifying at least one of said second plurality of references as a particular type of reference includes the steps of:

for each of said second plurality of references, determining if said each of said second plurality of references is associated with a writeback request;

in response to a determination that one of said second plurality of references is associated with a writeback request, determining a memory address associated with said one of said second plurality of references;

determining a previous one of said second plurality of references which is associated with said memory address associated with said one of said second plurality of references; and specifying said previous one of said second plurality of references as a particular type of reference.

4. The method according to claim 3 wherein said previous one of said second plurality of references is a closest of said second plurality of references.

5. The method according to claim 3, wherein said particular type of reference is associated with a designated state.

6. The method according to claim 5 wherein said step of determining performance characteristics of said cache design utilizing said result of said simulation and said quantity of said first plurality of references further includes the step of determining a quantity of writebacks which occur during said simulation.

7. The method according to claim 1 wherein said step of determining performance characteristics of said cache design utilizing said result of said simulation and said quantity of said first plurality of references further includes the step of determining a miss rate which occurred during said simulation.

8. The method according to claim 1 wherein said period is a quantity of said second plurality of references.

9. The method according to claim 1 wherein said period is a particular period of time.

10. A system in a shared memory multiprocessor system for determining performance characteristics of a cache design, wherein each of said multiprocessors includes a private cache, and wherein said multiprocessors are capable of sharing data, comprising:

means for inputting a first plurality of references into one of said private caches during a specified period and generating an output which includes a second plurality of references utilizing said one of said private caches in response to said inputting, wherein said output includes only cache misses and cache writebacks:

means for storing said output of said one of said private caches generated during said specified period as a trace;

means for determining a quantity of said first plurality of references input into said one of said private caches during said specified period;

means for simulating operation of said cache design utilizing said trace by inputting said trace into a cache simulator;

means for determining a result of said simulation; and means for determining performance characteristics of said cache design utilizing said result of said simulation and said quantity of said first plurality of references.

11. The system according to claim 10 further comprising:

means for modifying said trace by specifying at least one of said second plurality of references as a particular type of reference, wherein said modified trace is utilized during said step of simulating operation of said one of said private caches.

12. The system according to claim 11, wherein said means for specifying at least one of said second plurality of references as a particular type of reference comprises:

means for each of said second plurality of references, for determining if said each of said second plurality of references is associated with a writeback request;

means responsive to a determination that one of said second plurality of references is associated with a writeback request, for determining a memory address associated with said one of said second plurality of references;

means for determining a previous one of said second plurality of references which is associated with said memory address associated with said one of said second plurality of references; and means for specifying said previous one of said second plurality of references as a particular type of reference.

13. The system according to claim 12 wherein said previous one of said second plurality of references is a closest of said second plurality of references.

14. The system according to claim 12, wherein said particular type of reference is associated with a modified state.

15. The system according to claim 14 wherein said means for determining performance characteristics of said cache design utilizing said result of said simulation and said quantity of said first plurality of references further includes means for determining a quantity of writebacks which occur during said simulation.

16. The system according to claim 10 wherein said means for determining performance characteristics of said cache design utilizing said result of said simulation and said quantity of said first plurality of references further includes means for determining a miss rate which occurred during said simulation.

17. The system according to claim 10 wherein said period is a quantity of said second plurality of references.

18. The system according to claim 10 wherein said period is a particular period of time.

19. A method in a shared memory multiprocessor system for determining performance characteristics of a cache design, wherein each of said multiprocessors includes a private cache, and wherein said multiprocessors are capable of sharing data, said method comprising the steps of:

inputting a first plurality of references into one of said private caches during a specified period;

generating an output which includes a second plurality of references utilizing said one of said private caches, wherein said output includes only cache misses and cache writebacks;

storing said output as an output trace;

modifying said output trace by marking a second plurality of references;

inputting said modified trace into a cache simulator to generate a simulator result; and determining performance characteristics of said cache design utilizing said simulator result.

20. The method according to claim 19 further including the steps of:

modifying said output trace by marking said second plurality of references by specifying at least one of said second plurality of references as a particular type of reference.

21. The method according to claim 20, wherein said specifying at least one of said second plurality of references as a particular type of reference includes the steps of:

for each of said second plurality of references, determining if said each of said second plurality of references is associated with a writeback request;

in response to a determination that one of said second plurality of references is associated with a writeback request, determining a memory address associated with said one of said second plurality of references;

determining a previous one of said second plurality of references which is associated with said memory address associated with said one of said second plurality of references; and specifying said previous one of said second plurality of references as a particular type of reference.

22. The method according to claim 21 wherein said previous one of said second plurality of references is a closest of said second plurality of references.

23. The method according to claim 22, wherein said particular type of reference is associated with a designated state.

24. The method according to claim 23 wherein said step of determining performance characteristics of said cache design utilizing said result of said simulation further includes the step of determining a quantity of writebacks which occur during said simulation.

25. The method according to claim 24 wherein said step of determining performance characteristics of said cache design utilizing said result of said simulation further includes the step of determining a miss rate which occurred during said simulation.

* * * * *